United States Patent
Stowell et al.

(10) Patent No.: US 7,233,083 B2
(45) Date of Patent: Jun. 19, 2007

(54) REDUCED COMPONENT POWER CONVERTER WITH INDEPENDENT REGULATED OUTPUTS AND METHOD

(75) Inventors: John R. Stowell, Sahuarita, AZ (US); Paul F. Kueber, Clearwater, FL (US)

(73) Assignee: Raytheon Company, Tucson, AZ (US)

( * ) Notice: Subject to any disclaimer, the term of this patent is extended or adjusted under 35 U.S.C. 154(b) by 464 days.

(21) Appl. No.: 10/618,062

(22) Filed: Jul. 11, 2003

(65) Prior Publication Data
US 2005/0035662 A1    Feb. 17, 2005

(51) Int. Cl.
*H02J 1/00* (2006.01)
(52) U.S. Cl. ....................................... 307/82
(58) Field of Classification Search ................ 307/82
See application file for complete search history.

(56) References Cited
U.S. PATENT DOCUMENTS
6,181,585 B1    1/2001    Cardwell 6,504,267 B1 *    1/2003    Giannopoulos .............. 307/31
2002/0037796 A1 *    3/2002    Harding et al. ............. 493/967

FOREIGN PATENT DOCUMENTS
EP    0 907 237 A2    7/1999
EP    1 213 820 A2    9/2000

* cited by examiner

*Primary Examiner*—Chau N. Nguyen
*Assistant Examiner*—Dru Parries
(74) *Attorney, Agent, or Firm*—Schwegman, Lundberg, Woessner & Kluth, P.A.

(57) ABSTRACT

A DC to DC switching power converter includes a shared set of high-side switching elements which may be operated at approximately a duty cycle approaching 50%, and one or more sets of low-side switching elements which may be operated at a lower duty cycle. The sets of low-side switching elements may be turned off early in response to a control signal to regulate a particular output. Steering diodes are included to inhibit current from flowing between the various low-side stages when turned of at different times. Freewheeling diodes reduce the need for snubber circuitry. The control signals may be isolated by high-speed optical couplers.

18 Claims, 3 Drawing Sheets

REDUCED COMPONENT POWER CONVERTER WITH INDEPENDENT REGULATED OUTPUTS AND METHOD

TECHNICAL FIELD

The present invention pertains to power converters and DC to DC power conversion, and in some embodiments, to power converters with DC isolated and independently regulated outputs.

BACKGROUND

DC to DC switching power converters are commonly used to convert one available DC voltage to one or more other DC voltages. With some conventional DC to DC power converters, the different voltage outputs may be coupled off of a single transformer. One problem with these conventional power converters is that independent regulation of the various outputs is difficult. This is especially a problem for low voltage applications which require precise output regulation. To achieve independent regulation of various outputs, conventional DC to DC power converters have utilized separate sets of high-side and low-side switches for each output. This is having a separate power converter for each independently regulated output. This conventional approach results in increased size, weight and number of components as well as reduced overall efficiency and reliability.

Thus there is a general need for an improved DC to DC switching power converter and method. There is also a need for a DC to DC power converter and method that provides more than one output from a single input. There is also a need for a DC to DC power converter and method that can provide for independent regulation of at least two or more outputs. There is also a need for a DC to DC power converter and method that provides more power forms. There is also a need for a DC to DC power converter and method that requires fewer components and utilizes less packaging space. There is also a need for a DC to DC power converter and method that more efficiently and reliably produces independently regulated outputs.

SUMMARY

A DC to DC switching power converter includes a shared set of high-side switching elements which may be operated at approximately a duty cycle approaching up to 50% and one or more sets of low-side switching elements which may be operated at up to or less than the duty cycle of the high-side elements. The sets of low-side switching elements may be turned off early in response to a control signal to regulate a particular output. Steering diodes are included to inhibit current from flowing between the various low-side stages when turned off at different times. Freewheeling diodes reduce the need for snubber circuitry. The control signals may be isolated by high-speed optical couplers.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention encompass the full scope of the claims and all available equivalents.

The present invention provides, among other things an improved DC to DC power converter and method of power conversion. In embodiments, the present invention also provides a DC to DC power converter and method with more than one output generated from a single input. In embodiments, the present invention also provides a DC to DC power converter and method with precise independent regulation of at least two or more outputs. In embodiments, the present invention also provides a DC to DC power converter and method that may require fewer components and utilize less packaging space. In embodiments, the present invention also provides a DC to DC power converter and method that more efficiently produces independently and precisely regulated outputs.

Figure 1:
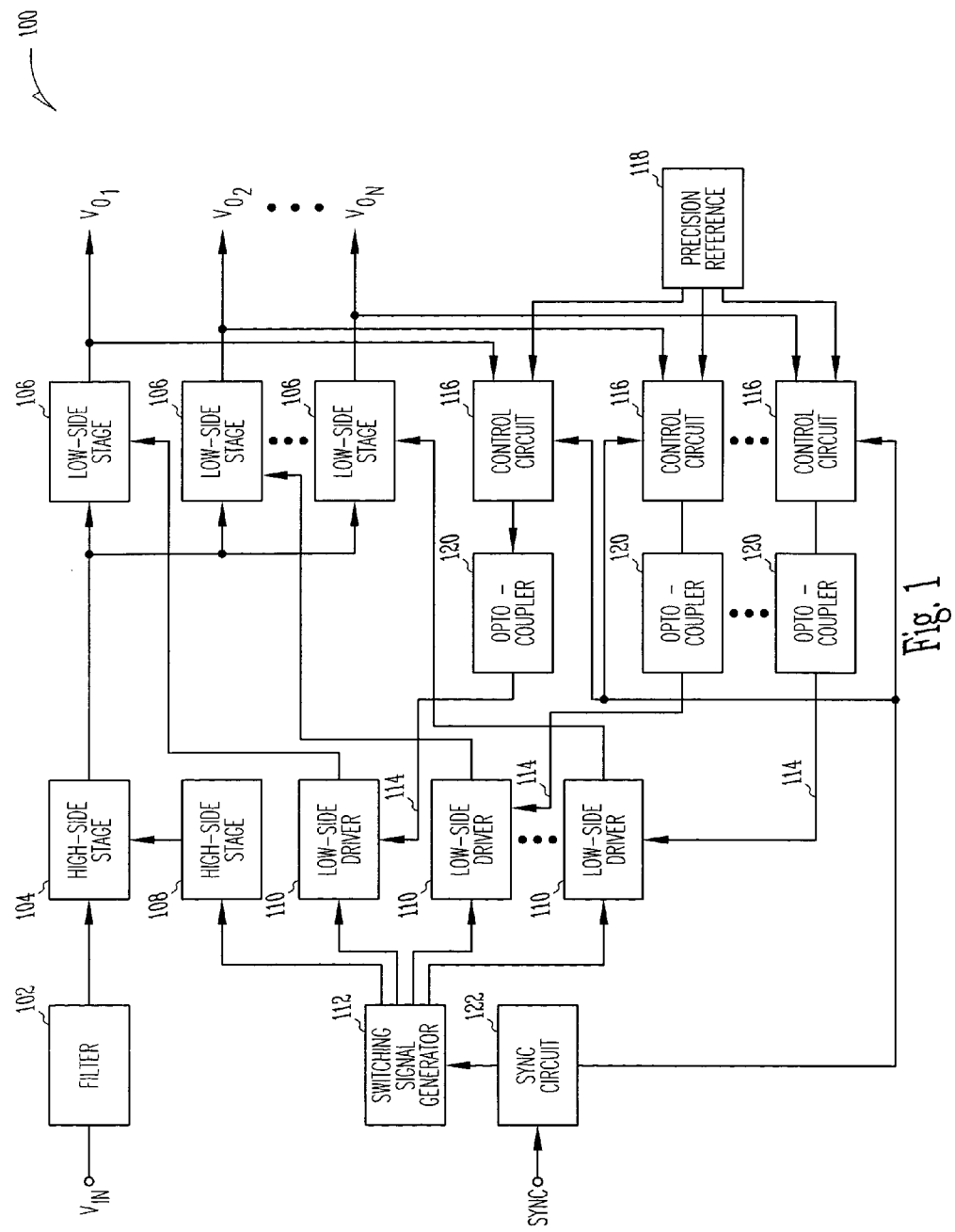
FIG. 1 is a functional block diagram of a power converter in accordance with an embodiment of the present invention.

FIG. 1 is a functional block diagram of a power converter in accordance with an embodiment of the present invention. Embodiments of power converter 100 generate up to two or more output voltages ($Vo_1$, $Vo_2$ through $Vo_n$) or output currents from a single input voltage (Vin). The input voltage may be an AC or DC voltage. Power converter 100 may include input filter 102 to filter the input, and shared high-side stage 104 and a plurality of low-side stages 106. Filter 102 may provide a DC or quasi-DC voltage to high side stage 104. High-side stage 104 may comprise a set of switching elements operated at about a duty cycle that may approach a constant 50%. Each low-side stage 106 may comprise a set of switching elements that may be operated at up to the duty cycle of the switching elements of the high-side stage. High-side driver 108 provides switching signals to the switching elements of high-side stage 104 based on a switching signal generated by switching signal generator 112. Low-side drivers 110 provide switching signals to switching elements of corresponding low-side stages 106 based on the switching signal generated by switching signal generator 112 and control signals 114.

In accordance with embodiments, low-side drivers 110 may cause the switching elements of corresponding low-side stages 106 to switch off in response to control signals 114 in order to regulate a corresponding output voltage/current. In these embodiments, a switching element of high-side stage 104 and a switching element of each low-side stage 106 may be switched on simultaneously, however the switching elements of the low-side stages 106 may be independently turned off before the switching element of high-side stage 104 is turned off. This is described in more detail below. The independent control of the switching elements of low-side stages 106 may allow for the independent and more precise regulation of several output voltages.

Control circuits 116 may generate control signals 114 by monitoring the appropriate output current and/or voltage generated by one of low-side stages 106. In one embodiment, control circuits 116 may compare the output voltage with voltage provided by precision reference 118, although other ways of monitoring outputs may be equally suitable. In one embodiment, control signal 114 may comprise a pulse causing low-side driver 114 to turn-off its driver circuit.

Power converter 100 may also include optical couplers 120 which provide electrical isolation between control circuits 116 and low-side drivers 110 while providing control signals 114 to drivers 110. This may allow different references for the input and output voltages, as well as different references between the output voltages. In some embodiments, transformers may be used in place of optical couplers 120 to provide isolation. In various embodiments, the input voltage may range between ±165 and ±350 volts DC although these embodiments are also suitable for use with lower and higher input voltages. In some embodiments, the input voltage may range somewhere between ±10 and ±1000 volts DC, although almost any input voltage may be suitable. In various embodiments, the output voltages may range from less than ±1 volt to more than ±10 volts, although almost any output voltage or current may be provided. In embodiments that include two low-side stages 106, the input voltage may be around ±135 volts and the output voltages may be approximately 3.3 volts and 5.0 volts. Although power converter is illustrated as having only a few low-side stages 106, embodiments of the present invention are equally suitable to power converters having many low-side stages.

Power converter 100 may also include synchronization circuit 122 for synchronization of the switching signals generated by switching signal generator with control signals 114. Depending on the application, synchronization circuit 122 may be response to an externally generated synchronization signal.

Although power converter 100 is illustrated as having several separate functional elements, one or more of the functional elements may be combined and may be implemented by combinations of software configured elements, such as processing elements including digital signal processors (DSPs), and/or other hardware elements. For example, control circuits 116 may comprise one or more microprocessors, DSPs, PLAs, application specific integrated circuits (ASICs), and combinations of various hardware and logic circuitry for at least performing the functions described herein.

In one embodiment, high side drivers 108 as well as low-side drivers 110 may include MOSFET driver circuitry which may act as a buffer. In this embodiment, control signal 114 may be used to switch off the output stage of the buffer.

In embodiments, switching signal generator 112 may include one or more transformers (not separately illustrated) to provide output signals for high-side driver 108 and low-side drivers 110. In these embodiments, each switching element of high-side stage 104 may be controlled by separate transformer windings to turn on and turn off the switching elements of high side stage 104 through driver 108. In these embodiments, one or more windings of the one or more transformers may be used to provide signals to low-side drives 110. A center tap winding may provide a switching signal to turn on switching elements of low-side stages 106, as well as provide power to the driver elements of drivers 110.

In one embodiment, switching signal generator 112 may be a square wave generating circuit that generates a pulse-width-modulated (PWM) output signal. In this embodiment, the transformer (not illustrated) may be used to generate separate outputs for the high-side and low-side drivers 108, 110. Control circuits 116 may be a pulse width modulator control circuit. Filter 102 may include a capacitor and/or combination of elements to perform input filtering. In embodiments, during certain operating conditions, filter 102 may receive an AC input and provide a quasi-DC output voltage for stage 104. In these embodiments and during other operating conditions, filter 102 may receive a DC input and provide a DC output for stage 104.

Figure 2:
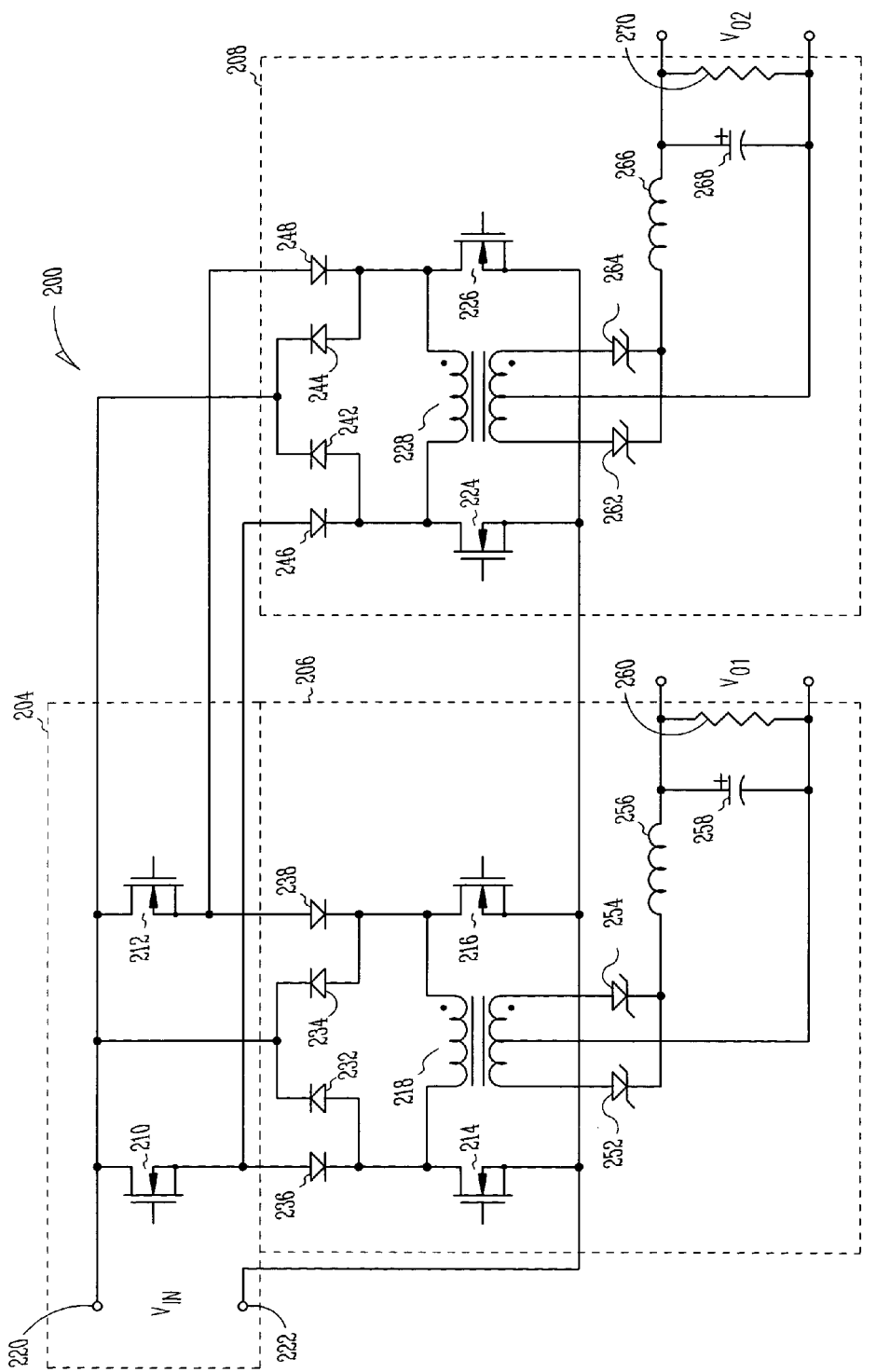
FIG. 2 is a simplified circuit diagram of a portion of a power converter in accordance with an embodiment of the present invention.

FIG. 2 is a simplified circuit diagram of a portion of a power converter in accordance with an embodiment of the present invention. Portion 200 may be suitable for use as high-side stage 104 and two of low-side stages 106 (FIG. 1), although other circuit configurations may also be suitable. In some embodiments, portion 200 may be viewed as a modified full-bridge. Portion 200 may include high-side stage 204, first low-side stage 206 and second low-side stage 208. Although portion 200 is illustrated with two low-side stages, embodiments of the present invention are equally suitable to many low-side stages.

High-side stage 204 may include first and second high-side switching elements 210 and 212 which may be alternatively switched on and off by switching signals. The switching signals may be provided by high-side driver 108 (FIG. 1). Low-side stage 206 may include first and second low-side switching elements 214 and 216 which may be alternative switched on and off by switching signals. The switching signals may be provided by one of low-side drivers 110 (FIG. 1). In one embodiment, switching elements 210 and 216 may be turned on simultaneously when switching elements 212 and 214 are off (e.g., not conducting) allowing current to flow from node 220 through switching element 210, diode 236, transformer 218, switching element 216 and to node 222. In this embodiment, switching elements 212 and 214 may be turned on simultaneously when switching elements 210 and 216 are off (e.g., not conducting) allowing current to flow from node 220 through switching element 212, diode 238, transformer 218, switching element 214 and to node 222. The alternating direction of current through the windings of transformer 218 generates current on the other windings for generating an output voltage (Vo1) or an output current.

Low-side stage 208 may include first and second low-side switching elements 224 and 226 which may be alternatively switched on and off by switching signals. The switching signals may be provided by another one of low-side drivers 110 (FIG. 1). In one embodiment, switching elements 210 and 226 may be turned on substantially simultaneously when switching elements 212 and 224 are off (e.g., not conducting) allowing current to flow from node 220 through switching element 210, diode 246, transformer 228, switching element 226 and to node 222. In this embodiment, switching elements 212 and 224 may be turned on substantially simultaneously when switching elements 210 and 226 are off (e.g., not conducting) allowing current to flow from node 220 through switching element 212, diode 248, transformer 228, switching element 224 and to node 222. The alternating direction of current through the windings of transformer 228 similarly generates current on the other windings for generating another output (Vo2).

Current flowing through switching element 210 is split between switching elements 216 and 226, while current flowing through switching element 212 is split between switching elements 214 and 224. The amount of current split may depend on the input loading voltage and voltage of the outputs of low-side stages 206 and 208.

In one embodiment, voltage regulation of the outputs may be achieved by switching off one of the switching elements of a low-side stage reducing the duty cycle of these elements to less than the duty cycle of the high-side stage. In other words, for stage 206, switching element 214 may be switched off before switching element 212 is switched off, and switching element 216 may be switched off before switching element 210 is switched off. Similarly for second low-side stage 208, switching element 224 may be switched off before switching element 212 is switched off, and switching element 226 may be switched off before switching element 210 is switched off.

Low-side stage 206 includes steering diodes 236 and 238, and low-side stage 208 includes steering diodes 246 and 248. The steering diodes help prevent current from flowing between the low-side stages when one stage is turned off before the other. For output regulation, switching elements of one of the low-side stages (e.g., stage 206) may be turned off before the switching elements of another low-side stage (e.g., stage 208). For example, the switching elements of low-side stage 206 may be turned off first. In this case, when switching element 212 is conducting and when switching element 214 is turned off before switching element 224 is turned off, steering diode 236 helps prevent current that would normally flow through transformer 218 from flowing to switching element 224. Similarly, when switching element 210 is conducting, steering diode 238 helps prevent current from flowing to switching element 226 when switching element 216 is turned off before switching element 226 is turned off.

In another example, the switching elements of low-side stage 208 may be turned off first. In this case, when switching element 212 is conducting, steering diode 246 helps prevent current from flowing to switching element 214 when switching element 224 is turned off before switching element 214 is turned off. Similarly, when switching element 210 is conducting, steering diode 248 helps prevent current from flowing to switching element 216 when switching element 226 is turned off before switching element 216 is turned off.

Low-side stage 206 includes freewheeling diodes 232 and 234. Freewheeling diode 234 allows current, due to the transformer leakage inductance, to flow from transformer 218 to node 220 when switching element 216 is turned off, and freewheeling diode 232 may allow current to flow from transformer 218 to node 220 when switching element 214 is turned off. Similarly, second low-side stage 208 may include freewheeling diodes 242 and 244. Freewheeling diode 244 may allow current to flow from transformer 228 to node 220 when switching element 226 is turned off, and freewheeling diode 242 may allow current to flow from transformer 228 to node 220 when switching element 244 is turned off. Freewheeling diodes 232, 234, 242 and 244 help reduce current spikes and possibly eliminate the need for snubber circuitry typically required in switching situations. This elimination of snubber circuitry may result in lower power dissipation and less generated noise. In alternate embodiments, the freewheeling diodes may be replaced with snubber networks at the expense of increased component count and lower converter efficiency.

Low-side stage 206 may also include rectifying diodes 252 and 254 coupled to the secondary winding of transformer 218, inductor 256 and capacitor 258. Inductor 256 and capacitor 258 may provide filtering for the output. Load 260 represents a load for the power converter output (Vo1) and is not necessarily part of the power converter circuitry.

Similarly, low-side stage 208 may also include rectifying diodes 262 and 264 coupled to the secondary winding of transformer 228, inductor 266 and capacitor 268. Inductor 266 and capacitor 268 may provide filtering for the output. Load 270 represents a load for the power converter output (Vo2) and is not necessarily part of the power converter circuitry.

Although the embodiments described above utilize diodes for freewheeling diodes 232, 234, 242 and 244 and steering diodes 236, 238, 246 and 248, almost any element that functions as a one-way current device may also be suitable for use with these embodiments of the present invention. Although switching elements 210, 212, 214, 216, 224 and 226 are illustrated as power-MOSFETs, they may be almost any device that may be operated as a switch. The elements may be selected based on the current and voltage requirements of the power converter. In some embodiments, switches such as transistors and junction FETs may be used.

Embodiments of the present invention are described herein where the switching elements of the high and low-side stages are turned on together and the switching elements of the low-side stages are turned off prior to the high-side stage to regulate the output. In alternate embodiments of the present invention, the turning on of the switching elements of the low-side stages may be delayed and the switching elements of the high and low-side stages may be turned off together to achieve substantially the same result. In other embodiments, the switching signals generated by switching signal generator 112 (FIG. 1) may be pulse width modulated to provide further regulation of the power converter outputs. In yet other embodiments, a single set of low-side switches (e.g., one low-side stage) may be used with multiple high-side switches (e.g., multiple high-side stages).

Figure 3:
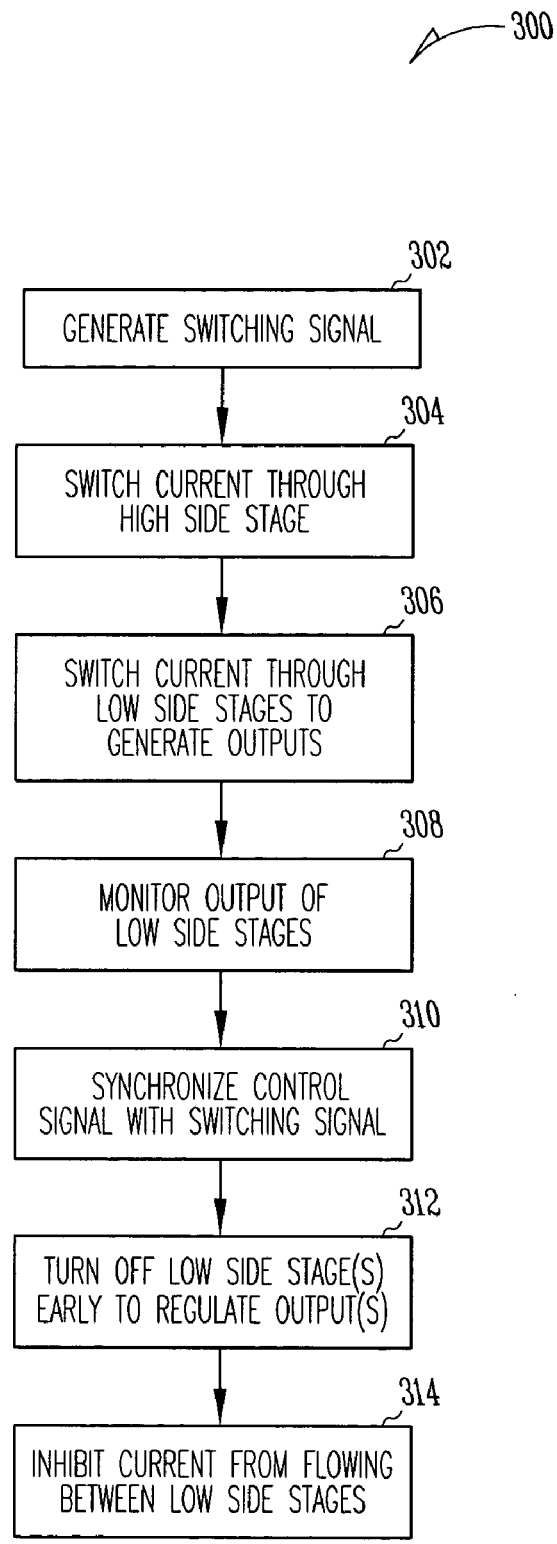
FIG. 3 is a flow chart of a power conversion procedure in accordance with an embodiment of the present invention.

FIG. 3 is a flow chart of a power conversion procedure in accordance with an embodiment of the present invention. Procedure 300 may be performed by power converter 100 (FIG. 1) although other power converters may also be suitable for performing procedure 300. Although the individual operations of procedure 300 are illustrated and described as separate operations, one or more of the individual operations may be performed concurrently and nothing requires that the operations be performed in the order illustrated.

In operation 302, a switching signal is generated. The switching signal may be substantially a square wave generated by a square wave generator. The switching signal may be buffered and modified in the driver circuitry before being applied to switching elements of a power converter. In one embodiment, the switching signal may be generated by switching signal generator 112 (FIG. 1) and provided to high-side driver 108 (FIG. 1) and a plurality of low-side drivers 110 (FIG. 1). The drivers may provide a buffered and amplified switching signal having a duty cycle of up to 50% to the switching elements of the power converter allowing certain switching elements to be alternatively switched on and off as previously discussed.

In operation 304, input current is switched through the single high-side stage of the power converter. In one embodiment, the input current may be alternatively switched through switching elements 210 and 212 (FIG. 2).

In operation 306, the current switched through the high-side stage may be switched through the plurality of low-side stages to generate an output of the low-side stages. In one embodiment, the current may be alternatively switched through switching elements 214 and 216 of low-side stage 206 (FIG. 2) while being alternatively being switched through elements 224 and 226 of low-side stage 208 (FIG. 2) to generate two outputs.

In operation 308, the output of the low-side stages is monitored and may be compared with a precision reference. In one embodiment, the control signal changes to compensate for when the output deviates from a desired output. Operation 308 may generate a control signal for each low-side stage. Operation 308 may be performed by control circuits 116 (FIG. 1). In operation 310, the control signal may be synchronized with the switching signal generated in operation 302.

In operation 312, a low-side stage may be turned off early to regulate its output in response to the control signal. In one embodiment, operation 312 may combine the switching signal with the control signal to turn off a switching element of a low-side stage before the turn off time indicated by the switching signal. In one embodiment, the control signal may be DC isolated from the driver circuitry with a transformer or an optical coupler, such as optical coupler 120 (FIG. 1).

In operation 314, current is inhibited from flowing between the low-side stages of the power converter when one low-side stage is switched off before one of the other low-side stages. Operation 314 may be performed by steering diodes, such as steering diodes 236 and 238, or steering diodes 246 and 248 depending on which of the low-side stages are turned off before another.

It should be noted that the operations of procedure 300 may be performed during a single period of a switching signal. It also should be noted that although the operations of procedure 300 are illustrated separately, several of the operations may be performed concurrently.

Thus, an improved power converter and method for DC to DC power conversion has been described. In embodiments, the DC to DC power converter and method provide more than one output generated from a single input. In embodiments, the DC to DC power converter and method provide precise independent regulation of at least two or more outputs. In embodiments, the DC to DC power converter and method may require fewer components and utilize less packaging space. In embodiments, the DC to DC power converter and method may also more efficiently produce independently and precisely regulated outputs.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A power converter comprising:
   a shared first-side stage to receive an input;
   a plurality of second-side stages coupled to the first-side stage, each of second-side stages to generate an output;
   control circuitry to separately monitor the outputs of the second-side stages and generate a control signal for each output, wherein the control signal turns off switching elements of a corresponding one of the second-side stage to regulate the output; and
   steering diodes in series with switching elements of the first-side stage coupling the switching elements of the first-side stage to switching elements of the second-side stages to allow forward bias current to flow from the switching elements of the first-side stage to the switching elements of the second-side stages and to inhibit current from flowing in a reverse bias direction between the switching elements of the second-side stages when a switching element of one of the second-side stages is turned off before a switching element of one of the other second-side stage; and
   a switching signal generator comprising a plurality of sets of transforming windings,
   wherein switching signals for switching on and off each of the switching elements of the first-side stage are each provided by separate windings of the sets of transforming windings, and
   wherein center tap windings of the sets of transforming windings provides a switching signal for switching on and off one of the switching elements of the second-side stages.

2. The power converter of claim 1 further comprising:
   a plurality of second-side driver circuits, each to provide one of the second-side stages with a combined signal corresponding with the switching signal and one of the control signals, the second-side driver circuit turning off switching elements of the second-side stages in response to the one control signal,
   and
   wherein the center tap, winding further provides power to driver elements of the second-side driver circuits.

3. The power converter of claim 2 wherein the second-side stages each comprise a transformer and a set of second-side switching elements which are alternatively turned on and off in response to the switching signal from a corresponding second-side driver circuit, the second-side switching elements being turned off based on the control signal to regulate the output.

4. The power converter of claim 3 wherein the switching signal has a duty cycle of up to 50%, and the combined signal has a duty cycle of less than the duty cycle of the switching signal,
   wherein the duty cycle of the combined signal being controlled by the control signal.

5. The power converter of claim 2 wherein the first-side stage comprises first and second switching elements which are alternatively switched on and off, and wherein the plurality of second-side stages comprise a first and a second second-side stage, the first second-side stage comprising third and fourth switching elements which are alternatively switched on and off, the second second-side stage comprising fifth and sixth switching elements which are alternatively switched on and off.

6. The power converter of claim 5, wherein the switching signal turns on the first, third and fifth switching elements at substantially the same time,
   wherein the combined signal associated with the first second-side stage turns off the third switching element before the switching signal turns off the first switching element, and
   wherein the combined signal associated with the second second-side stage turns off the fifth switching element before the switching signal turns off the first switching element.

7. The power converter of claim 1 wherein the power converter further comprises a freewheeling diodes associated with each switching element of the first-side stage, the freewheeling diodes coupling the input side of each of the transformers to an input of the first-side stage to allow-inductive leakage current to flow from the transformers when the associated switching element is turned off, wherein the steering diodes and an associated one of the switching elements of the first-side stage are coupled in series, and wherein the freewheeling diodes are coupled in parallel to the series coupling of the steering diodes and associated switching elements of the first-side stage.

8. The power converter of claim 1 wherein the shared first-side stage is a high-side stage to receive an input voltage that is greater than an output voltage, and the plurality of second-side stages are low-side stages.

9. The power converter of claim 1 wherein the shared first-side stage is a low-side stage to receive an input voltage that is lower than an output voltage, and wherein the plurality of second-side stages are high-side stages.

10. A power converter comprising:

a single set of high-side switching elements;

a plurality of sets of low-side switching elements coupled to the high-side switching elements;

control circuits to turn off the low-side switching elements of at least one of the sets before the high-side switching elements to regulate an output;

steering diodes in series with the high-side switching elements and coupling the low-side switching elements with the high-side switching elements, the steering diodes allowing forward bias current to flow from the high-side switching elements to the low-side switching elements, the steering diodes inhibiting current in a reverse bias direction from flowing between the sets of low-side switching elements; and a switching signal generator comprising a plurality of sets of transforming windings, wherein switching signals for switching on and off each of the high-side switching elements are each provided by separate windings of the sets of transforming windings, and wherein center tap windings of the sets of transforming windings provides a switching signal for switching on and off one of the low-side switching elements.

11. The power converter of claim 10 wherein each switching element of the low-side sets has a corresponding one of the steering diodes, and wherein the center tap winding further provide power to driver elements of the second-side driver circuits.

12. The power converter of claim 10 further comprising:

a freewheeling diode associated with each switching element of the low-side sets, the freewheeling diodes allowing leakage current to flow from one of a plurality of transformers to the input when the associated switch it turned off, wherein the steering diodes and an associated one of the high-side switching elements are coupled in series, and wherein the freewheeling diodes are coupled in parallel to the series coupling of the steering diodes and associated high-side switching elements.

13. The power converter of claim 10 wherein an input current is split between the sets of the low-side switching elements after flowing through one of the high-side switching elements, the split based on output loading of the sets of the low-side switching elements.

14. The power converter of claim 10 further comprising:

a plurality of low-side control circuits each associated with one of the sets of low-side switching elements, each low-side control circuit to monitor one of a plurality of outputs and to generate a control signal to change a duty-cycle of the low-side switching elements of the associated set.

15. The power converter of claim 14 further comprising a low-side driver circuit for each set of the low-side switching elements, the low-side driver circuits to provide switching signals to the low-side switching elements based on the switching signals from the switching signal generator and one of the control signals, wherein low-side driver circuit, based on the control signal from the associated control circuit, changes the duty cycle of the switching signal provided by the low-side driver circuit to the low-side switching elements to regulate an associated output.

16. The power converter of claim 15 wherein when a first switch of a first set of low-side switching elements is turned off before a second switch of a second set of low-side switching elements, a steering diode associated with the first switch inhibits current from flowing from a transformer associated with the first set of low-side switching elements to a transformer associated with the second set of low-side switching elements.

17. The power converter of claim 15 further comprising an optical coupler to electrically isolate the low-side control circuit from the low-side driver circuitry.

18. The power converter of claim 10 further comprising a plurality of transformers, each transformer associated with one of the sets of the low-side switching elements to generate one of a plurality of outputs.

* * * * *